(12) United States Patent
Fontaine et al.

(10) Patent No.: US 12,461,699 B2
(45) Date of Patent: Nov. 4, 2025

(54) VISUAL CONTROL SYSTEM FOR AN EXTENDED PRODUCT

(71) Applicant: Clecim SAS, Savigneux (FR)

(72) Inventors: Yvon Fontaine, Montbrison (FR); Stephane Gouttebroze, Precieux (FR)

(73) Assignee: CLECIM S.A.S., Savigneux (FR)

( * ) Notice: Subject to any disclaimer, the term of this patent is extended or adjusted under 35 U.S.C. 154(b) by 986 days.

(21) Appl. No.: 17/437,494

(22) PCT Filed: Mar. 12, 2020

(86) PCT No.: PCT/EP2020/056585
§ 371 (c)(1),
(2) Date: Sep. 9, 2021

(87) PCT Pub. No.: WO2020/187675
PCT Pub. Date: Sep. 24, 2020

(65) Prior Publication Data
US 2022/0156024 A1    May 19, 2022

(30) Foreign Application Priority Data
Mar. 15, 2019   (EP) .................................... 19290015

(51) Int. Cl.
*G06F 3/14*   (2006.01)
*G01N 21/88*  (2006.01)
(Continued)

(52) U.S. Cl.
CPC ........... *G06F 3/14* (2013.01); *G01N 21/8803* (2013.01); *G01N 21/8851* (2013.01);
(Continued)

(58) Field of Classification Search
None
See application file for complete search history.

(56) References Cited

U.S. PATENT DOCUMENTS 7,201,316 B2 *  4/2007  Anderson ................. B07C 3/20
                                                        235/382
7,296,956 B2 * 11/2007  Dirnfeldner ....... B23Q 11/0891
                                                        451/6
(Continued)

FOREIGN PATENT DOCUMENTS

CN      103091328 A    5/2013
CN      103649775 A    3/2014
(Continued)

OTHER PUBLICATIONS

Olwal, Alex, Jonny Gustafsson, and Christoffer Lindfors. "Spatial augmented reality on industrial CNC-machines." The Engineering Reality of Virtual Reality 2008. vol. 6804. SPIE, 2008. (Year: 2008).*

(Continued)

*Primary Examiner* — Carlos R Ortiz Rodriguez
(74) *Attorney, Agent, or Firm* — Laurence A. Greenberg; Werner H. Stemer; Ralph E. Locher

(57) ABSTRACT

A visual control system for an extended product being a wire, a tube, a plate, a strip or a series of juxtaposed elements type contains a first measurement zone with an inspection unit for automatically inspecting a portion of the product advancing along a longitudinal path. The inspection unit delivering at least one map having qualitative information of an inspected portion of the product. A second control zone is disposed downstream of the first measurement zone and has a device for overprinting at least the qualitative information on the portion of the product. The second control zone being intended for displaying the portion as it arrives in the second control zone.

17 Claims, 2 Drawing Sheets

(51) Int. Cl.
  *G01N 21/89* (2006.01)
  *G03B 21/62* (2014.01)
  *G06T 7/00* (2017.01)
  *G06T 11/00* (2006.01)
  *H04N 9/31* (2006.01)

(52) U.S. Cl.
  CPC ..... *G01N 21/8901* (2013.01); *G01N 21/8914* (2013.01); *G03B 21/62* (2013.01); *G06T 7/0004* (2013.01); *G06T 11/00* (2013.01); *H04N 9/31* (2013.01); *G01N 2021/888* (2013.01); *G01N 2021/8893* (2013.01); *G01N 2021/8918* (2013.01); *G06T 2207/30108* (2013.01)

(56) References Cited

U.S. PATENT DOCUMENTS

| | | | |
|---|---|---|---|
| 8,985,438 | B2 | 3/2015 | Hieronimi |
| 9,710,141 | B2 | 7/2017 | Braun et al. |
| 10,372,096 | B2 * | 8/2019 | Ottosson ............... G05B 19/042 |
| 2011/0050872 | A1 | 3/2011 | Harbert et al. |
| 2013/0114882 | A1 | 5/2013 | Kawata |
| 2014/0249663 | A1 | 9/2014 | Voillaume |
| 2017/0074805 | A1 | 3/2017 | Paul et al. |
| 2018/0082551 | A1 | 3/2018 | Burke |
| 2018/0350055 | A1 * | 12/2018 | Cardenas Bernal .... G06F 30/15 |

FOREIGN PATENT DOCUMENTS

| | | |
|---|---|---|
| CN | 104114992 A | 10/2014 |
| CN | 105455830 A | 4/2016 |
| DE | 102006014345 B3 | 8/2007 |
| FR | 2879292 A1 | 6/2006 |
| JP | H0989803 A | 4/1997 |
| WO | 2014041416 A1 | 3/2014 |

OTHER PUBLICATIONS

Nee, Andrew YC, et al. "Augmented reality applications in design and manufacturing." CIRP annals 61.2 (2012): 657-679. (Year: 2012).*

Fiorentino, Michele, et al. "Augmented reality on large screen for interactive maintenance instructions." Computers in Industry 65.2 (2014): 270-278. (Year: 2014).*

Krüger, Jörg, et al. "Innovative control of assembly systems and lines." CIRP annals 66.2 (2017): 707-730. (Year: 2017).*

Piironen, Timo, et al. "Automated visual inspection of rolled metal surfaces." Machine vision and applications 3 (1990): 247-254. (Year: 1990).*

O'Leary, Paul. "Machine vision for feedback control in a steel rolling mill." Computers in Industry 56.8-9 (2005): 997-1004. (Year: 2005).*

Martins, Luiz AO, Flávio LC Pádua, and Paulo EM Almeida. "Automatic detection of surface defects on rolled steel using computer vision and artificial neural networks." IECON 2010—36th Annual Conference on IEEE Industrial Electronics Society. IEEE, 2010. (Year: 2010).*

Zhao, Liming, et al. "Study on CCD laser scanning flatness measurement method for hot rolled strip." Ironmaking & Steelmaking 42.8 (2015): 600-607. (Year: 2015).*

Liu Zijian et al., Principles and Application Technologies of Computer-Aided Design (CAD), 1997, ISBN-10 : 7810531034, pp. 222-223, Hunan University Press, Changsha, China.

* cited by examiner

VISUAL CONTROL SYSTEM FOR AN EXTENDED PRODUCT

FIELD AND BACKGROUND OF THE INVENTION

The present invention relates to a visual control system for an extended product according to the preamble of the independent claim.

In order to control the quality of an extended product such as a wire, tube, plate, strip or a series of juxtaposed elements, visual control systems for controlling said product are known and comprise:
- a measurement zone comprising a unit for inspecting, automatically and in real time, a product portion advancing along a longitudinal path,
- said inspection unit delivering at least one map comprising qualitative information on said inspected portion of the product.

After this automatic inspection phase, it is thus possible for an operator on a line for producing, treating, coating, etc. said product to detect potential defects or other characteristics of the product by means of a monitor for the map, in order to ensure quality within prescribed tolerances.

One exemplary application is the field for automatically controlling extended products of metallurgical type such as, inter alia, wires, tubes, plates, strips, etc., for which the applicant has developed an automatic and real-time inspection unit under the internationally registered trademark SIAS®, which is well known to larger metal producers.

Other applications of such an automatic inspection unit are also possible, for example in the field of series of juxtaposed elements, such as those in the continuous mass production of products on a moving production line. By way of example, mention may be made of production lines for consumables (chocolates, breads, cakes, drugs, etc.), containers (yoghurts, bottles, cups, etc.), mechanical or electronic parts (screws, washers, printed circuit boards, etc.), and flat products (paper, glass, fabric, leather, rubber, etc.).

Such an inspection unit thus makes it possible to automatically detect, locate, classify and then view defects in products on the move on a monitor by having there map data (including, for example, images of the product and more particularly its defects) comprising the qualitative information on each of said inspected portions of the product.

This visualization via a monitor is certainly very convenient but may reach its limits for real-time visual control by an operator, especially if the inspected product runs at high speed under the inspection unit, for example at more than 0.1 m/s. This is why, for higher product movement rates, an additional visual control via a monitor may thus be performed at least by slowly reviewing the map data from the inspection unit.

Lastly, it is common practice, once the operator has become aware from the map data of the presence of defects to be visually controlled, to pass the product through another visual inspection module of table or conveyor type with a movement speed suitable for human vision and capable even of stopping a precise product portion beneath a visual inspection zone where the map indicates that there is a defect to be controlled. In this way, the operator may visually relocate, and then physically recheck the presence of the defects previously noted by the map on their monitor (or PC/tablet) and, if necessary, mark them for the purpose of addressing them or otherwise highlighting them as a product portion unsuitable for sale, for example.

However, if it happens that one of the detected defects is an artifact due to a given unexpected measurement condition for the automatic inspection unit, the operator will thus not be able to easily and therefore quickly find the location of the artifact in order to ultimately deduce that this is not a defect.

SUMMARY OF THE INVENTION

An object of the present invention is to provide a visual control system for an extended product which makes it possible to simplify and improve the visual (human) control required following an automatic inspection of said product as presented above.

Such a system is proposed through the features of the independent claim.

On the basis of a visual control system for an extended product such as a wire, tube, plate, strip or series of juxtaposed elements, comprising:
- a first, measurement zone comprising an automatic inspection unit for inspecting a product portion advancing along a longitudinal path,
- said inspection unit delivering, in real time if possible, at least one map comprising qualitative information on said inspected portion of the product, the invention provides for said system to comprise a second, control zone arranged downstream of the first zone and comprising a means for overlaying at least the qualitative information onto the portion of the product in said second zone, the second zone being dedicated to allowing a control operator to view said portion as it arrives in the second zone. To that end, a module for tracking (using recognition, metric values, etc.) said portion may deliver an identification signal for the portion of the product inspected by the first zone to the overlaying means of the second zone. Thus, the qualitative information on the portion measured by automatic inspection in the first zone may be overlaid with absolute precision onto the same portion of the product in the second zone.

The operator-product interfacing during the required visual control following an automatic inspection of said product is thus advantageously performed directly by virtue of the overlaying means allowing the operator to see, in superposition, the actual product, its actual defects or qualities, and the qualitative information measured upstream by the automatic inspection unit (measured artifacts or defects). Said interfacing is also performed in a simpler manner, since during the physical visual control, there is no longer the need to also have to view a recording (on screen/PC/tablet) originating from maps prerecorded previously by the automatic inspection unit, and then have to relocate them on the product in the physical visual control zone.

This simplification thus makes it possible for an operator to save valuable time and allow them to be simply guided by the automatic location of the overlaid defects or other artifacts without having to search for them or even never finding them.

A set of subclaims also exhibits advantages of the invention.

In particular, in the second zone, the overlaying means may dynamically display location marks (markers, arrows, etc.), characterization marks (defect type) and/or quantification marks (defect intensity) related to the detected qualitative information for portions of the product during automatic inspection in the first zone.

In addition, the second zone is located in a fixed zone dedicated to visual inspection of the product by an operator, ideally in which the advancement of the product can be slowed or even stopped. In this way, it is advantageously possible to allow human visual control for high speeds (>0.1 m/s) of movement of the product through the first, automatic inspection zone. It is then finally possible for an operator to have the time to be able, if possible, to address a defect locally, for example with a manual honing action, so that the product is immediately returned to an acceptable quality standard.

The system according to the invention is especially well suited in the case when the product is made of metal, the inspection unit and the overlaying means being arranged downstream of a module for producing, treating or surface-coating the product. Specifically, in the field of metal extended products such as wires, tubes, plates or strips in particular, production dictates production, treatment or other coating speeds that often exceed 0.1 m/s while said products are automatically inspected in the first zone. These products are also very bulky and heavy, and since their production, treatment or other coating is expensive and complex, it is important to inspect them visually at the earliest opportunity in case of potential defects which would make them irremediably unsuitable for undergoing costly subsequent treatments. The overlaying means is thus a highly suitable solution for being able to view such defects early and interactively for a quality control operator, without having to repeat a new visual search for said defects after having obtained a complete map of the defects following the complete run of the product through the first zone.

Exemplary embodiments and applications are provided using the described figures.

DETAILED DESCRIPTION OF THE INVENTION

Figure 1:
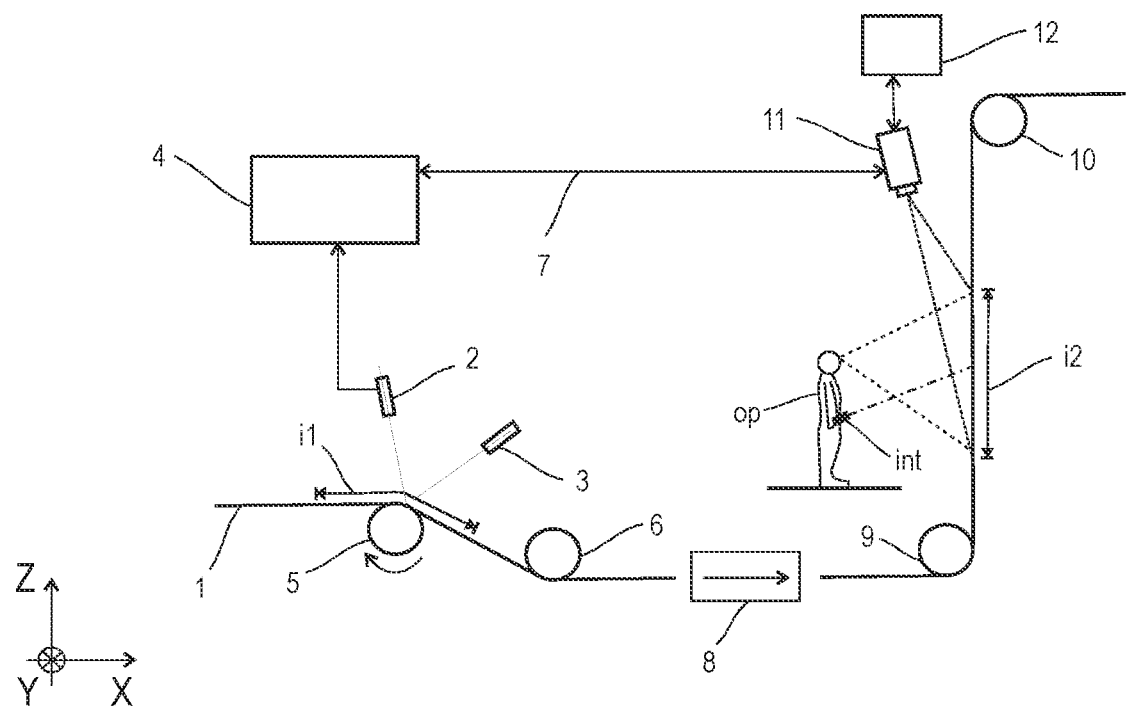
FIG. 1 shows a visual control system according to a first embodiment of the invention.

FIG. 1 shows a first embodiment of the invention in which is presented a visual control system for an extended product (1) such as a wire, tube, plate, strip or series of juxtaposed elements comprising:

a first, measurement zone (i1) comprising an inspection unit—camera (2), means (3) for illuminating one face of the product, data processing unit (4)—automatic for a product portion advancing along a longitudinal path (X), said inspection unit (4) delivering at least one map (7) comprising qualitative information on said inspected portion of the product, a second, control zone (i2) arranged downstream of the first zone (i1) and comprising means (11) for overlaying at least the qualitative information directly onto the portion of the product (here the face inspected automatically under the first zone), the second zone being dedicated to allowing an operator (op) to view said product portion as it arrives in the second zone.

A strip portion tracking module (not shown) delivers an identification signal for the portion of the product inspected by the first zone to the overlaying means of the second zone, so that the qualitative information on the portion measured by automatic inspection in the first zone may be overlaid with absolute precision onto the same portion of the product in the second zone.

The overlaying means dynamically displays location marks (markers, arrows, etc.), characterization marks (defect type) and/or quantification marks (defect intensity) related to the detected qualitative information for portions of the product.

It may also display other information of use to the operator, such as, for example, the thickness of the product, its material, its production tolerances, treatment or coating, its speed recorded at various stages on its run, and alerts for defects due to marks related to worn or damaged parts originating from the installations through which the product ran.

The overlaying means (11) may be coupled to a database management system (12) for the qualitative information (7) issued by the inspection unit (2, 3, 4), and optionally interactive data issued by an interactive interface (int) with respect to the operator and which are intended to confirm, disconfirm or modify said overlaid qualitative data. In this way, if, for example, the operator detects an artifact while the associated qualitative datum indicates a specific defect, it may modify it immediately under a new category "artifact". Thus, in the database (12), the map originating from the inspection unit (2, 3, 4) may be immediately updated with corrected real information.

Such an interactive interface (int) may comprise a detector of signals (gestures, stylus, pointers, etc.) and be easily coupled to the overlaying means so that an operator interacts with the qualitative information overlaid on the product. Lastly, the interactive interface then initiates updating of the database of real data but also of training data related to the qualitative information delivered by the inspection unit, which may in fact comprise an artificial intelligence that requires training, for example when product parameters or the treatment thereof are changed.

The overlaying means may also comprise one or more optical filters or other spectral illumination means which allow the operator to better discern the actual defect on the overlaid product.

In the case of FIG. 1, the overlaying means is a videoprojector (11) which is preferably arranged above the operator and the second zone (which is here vertical). More generally, it is advantageous for the overlaying means (such as a videoprojector) to have axes of projection/reflection that are close to the direction of advancement of the product and, in particular, out of the line of sight of the operator. In this way, direct reflections from the projector which might dazzle the operator can be avoided, for example for a product of reflective character (such as a metallic-textured product).

Nowadays, such "interactive" videoprojectors make it possible to easily produce an interactive interface (int) as previously described on a planar zone such as in the second zone (i2).

In the example according to FIG. 1, the overlaying means such as a videoprojector just simply projects the qualitative information directly onto the product, more specifically onto the face of product inspected automatically in the first zone (i1). However, it would also be possible for said overlaying means to project the qualitative information onto a transparent screen arranged between the operator and the product and sized to allow an operator to view the entirety of the product portion in the background of the screen. The operator could thus directly touch the screen with their hand (or a stylus) to interact with the projected data.

The example of FIG. 1 (like the following examples according to FIGS. 2 and 3) shows an extended production line where:
- the second zone is located in a fixed zone dedicated to visual inspection of the product by an operator (op), ideally in which the advancement of the product is slowed or even stopped in order to allow visual control of the actual product and its defects marked by a (human) operator;
- The first, upstream zone and the second, downstream zone are inserted
  - into one or more distinct longitudinal (X, Z) planes (8) with continuous advancement of the product; in other words and for example, the line comprising the first zone (i1) may be a continuously advancing production line for the product coupled to another line downstream comprising an accumulator for slowing the continuous advancement of the product and allowing the product to be inspected by virtue of the system according to the invention in the second zone (i2);
  - and/or into one or more longitudinal (X, Z) planes (8) with discontinuous advancement of the product; in other words and for example, the line comprising the first zone (i1) may be a continuously advancing production line for the product which comprises a winder for the product, and then the product is unwound again into another, distinct line downstream of the production line at a sufficiently low speed for the product in order to allow the product to be inspected by virtue of the system according to the invention in the second zone (i2). According to this scheme, it is then advantageously easier to automatically find and to remove, on the distinct line downstream of the production line, portions that are better delimited and inspected upstream as defective from a strip placed on a mother reel and produced on the first line, and then unwound into the distinct line downstream so as to finally produce a daughter strip which is free of defects and may be rewound with the optimal guarantee of the desired tolerances.

Figure 2:
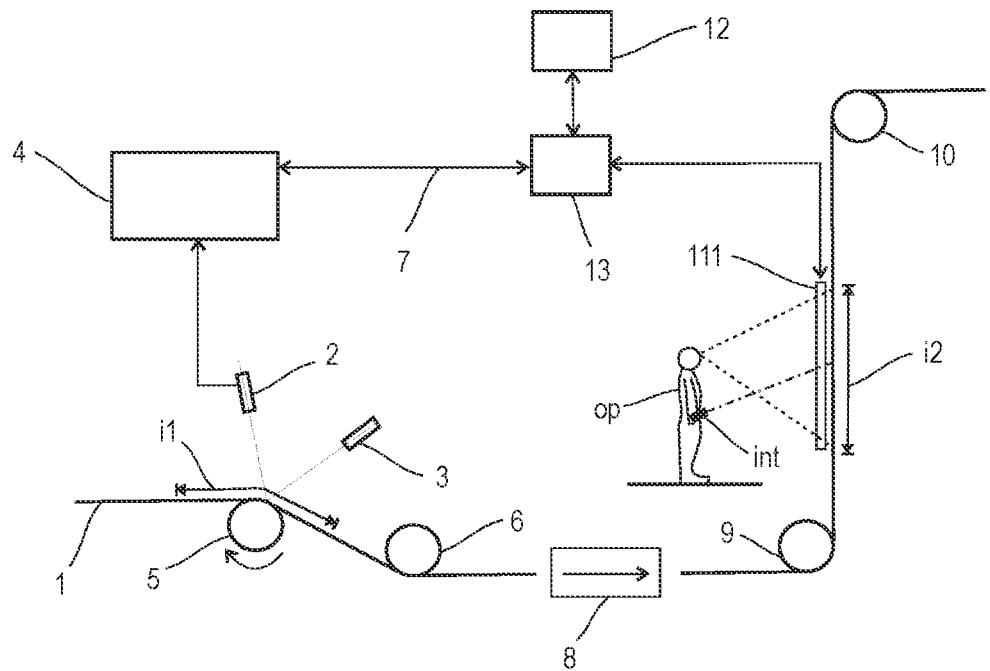
FIG. 2 shows a visual control system according to a second embodiment of the invention.

FIG. 2 shows a visual control system according to a second embodiment of the invention, which is substantially identical to that of FIG. 1.

Alternatively, the overlaying means is a graphic display (111) arranged facing the second zone (i2), such as a partially or completely transparent liquid-crystal display sized to allow an operator to view the entirety of the product portion in the background of the screen. This graphic display may also be a touch display (via finger, stylus, etc.) to allow interactivity between the operator (op) and the qualitative data (7) or other, additional data displayed by the screen.

Figure 3:
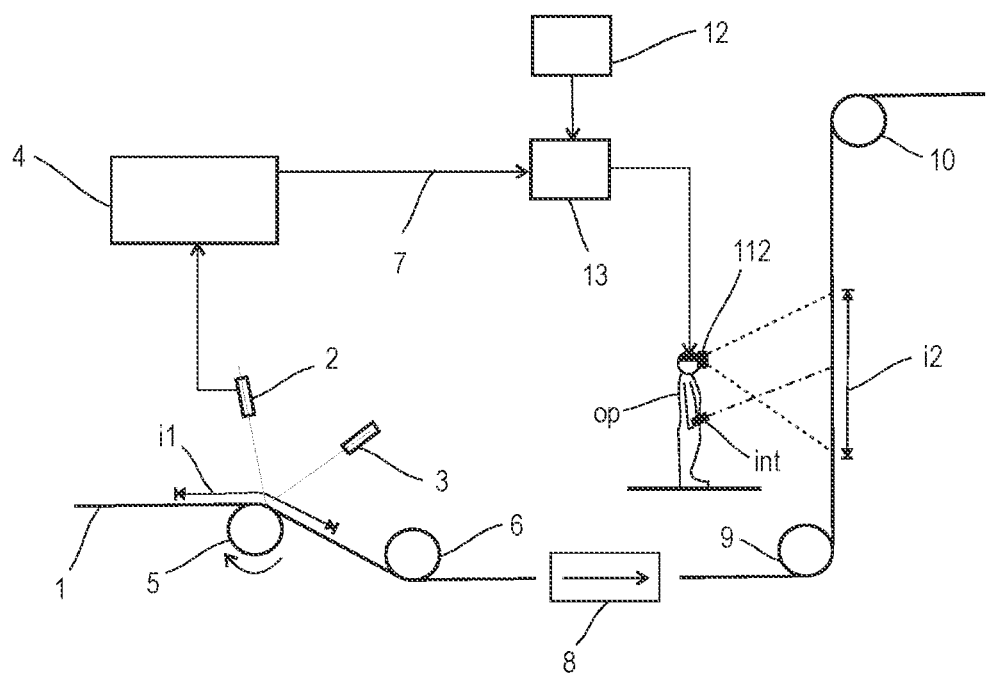
FIG. 3 shows a visual control system according to a third embodiment of the invention.

FIG. 3 shows a visual control system according to a third embodiment of the invention, which is substantially identical to that of FIG. 1.

Alternatively, the overlaying means is a virtual vision optic (112) borne by the operator (op), ideally in the form of an eyepiece or a headset. This optic is nowadays associated with interactive hand controls to allow interactivity between the operator (op) and the qualitative data (7) or other, additional data ("augmented reality" data) displayed by said optic.

The invention claimed is:

1. A metallurgical defect detection system for detecting a metallurgical defect on a metal product, the metallurgical defect detection system comprising:
   a first measurement zone having an automatic inspection unit for inspecting a product portion advancing along a longitudinal path, said automatic inspection unit delivering at least one map having qualitative information on the product portion inspected including detected defect information having information on a location of the metallurgical defect and type of defect; and
   a second control zone disposed downstream of said first measurement zone, said second control zone containing an overlaying means for overlaying at least the qualitative information onto the product portion of the product at the location of the metallurgical defect, said second control zone being dedicated to displaying the product portion as it arrives in said second control zone, the product being of a metallurgical type and is a wire, tube, plate or strip.

2. The system according to claim 1, wherein said overlaying means dynamically displays location marks, characterization marks and/or quantification marks related to detected qualitative information for portions of the product.

3. The system according to claim 1, wherein said second control zone is disposed in a fixed zone dedicated to visual inspection of the product by an operator.

4. The system according to claim 1, wherein the product is made of metal, said automatic inspection unit and said overlaying means are disposed downstream of a module for producing, treating or surface-coating the product.

5. The system according to claim 1, further comprising an interactive interface having a detector of signals and coupled to said overlaying means so that an operator interacts with the qualitative information being projected.

6. The system according to claim 5, wherein said interactive interface initiates updating of a training database related to the qualitative information delivered by said automatic inspection unit.

7. The system according to claim 1, wherein said overlaying means contains optical filters or spectral illumination means.

8. The system according to claim 1, wherein said overlaying means is a video projector.

9. The system according to claim 8, wherein said overlaying means projects the qualitative information onto the product.

10. The system according to claim 8, further comprising a transparent screen, said overlaying means projecting the qualitative information onto said transparent screen sized to allow an operator to view an entirety of the product portion in a background of said transparent screen.

11. The system according to claim 1, wherein said overlaying means is a graphic display.

12. The system according to claim 1, wherein said overlaying means is a virtual vision optic borne by an operator.

13. The system according to claim 1, further comprising a tracking module which delivers an identification signal for the product portion of the product inspected by said first measurement zone to said overlaying means of said second control zone.

14. The system according to claim 1, wherein said first measurement zone and said second control zone are inserted:
   into at least one distinct longitudinal plane with continuous advancement of the product; and/or
   into the at least one longitudinal plane with discontinuous advancement of the product.

15. The system according to claim 11, wherein said graphic display is a partially or completely transparent liquid crystal display sized to allow an operator to view an entirety of the product portion in a background of said graphic display.

16. The system according to claim 12, wherein said virtual vision optic borne by the operator is in a form of an eyepiece or a headset.

17. The system according to claim 3, wherein during the visual inspection of the product by the operator advancement of the product is slowed or even stopped.

* * * * *